United States Patent [19]

Lohninger

[11] Patent Number: 5,764,189
[45] Date of Patent: Jun. 9, 1998

[54] DOPPLER RADAR MODULE

[75] Inventor: Gerhard Lohninger, Munich, Germany

[73] Assignee: Siemens Aktiengesellschaft, Munich, Germany

[21] Appl. No.: 714,311

[22] Filed: Sep. 18, 1996

[30] Foreign Application Priority Data

Sep. 27, 1995 [DE] Germany ............ 195 35 962.3

[51] Int. Cl.$^6$ ........................................ H01Q 1/38
[52] U.S. Cl. ........................ 343/700 MS; 343/846; 333/246
[58] Field of Search ............. 343/700 MS, 829, 343/846, 909, DIG. 2; 333/204, 246, 247; H01Q 1/38, 13/08

[56] References Cited

U.S. PATENT DOCUMENTS

| | | | |
|---|---|---|---|
| 4,260,988 | 4/1981 | Yanagisawa et al. | 343/700 |
| 4,967,201 | 10/1990 | Rich, III . | |
| 5,068,669 | 11/1991 | Koert et al. | 343/700 |
| 5,153,600 | 10/1992 | Metzler et al. | 333/204 |
| 5,270,722 | 12/1993 | Delestre | 343/700 |
| 5,453,754 | 9/1995 | Fray | 343/700 |
| 5,455,594 | 10/1995 | Blasing et al. | 343/700 |
| 5,497,163 | 3/1996 | Lohninger et al. | |

Primary Examiner—Micheal C. Wimer
Assistant Examiner—Tho Phan
Attorney, Agent, or Firm—Hill & Simpson

[57] ABSTRACT

A Doppler radar module, having an operating frequency of about 2.45 GHz, is constructed in microstrip line technology and has a very small construction size. The Doppler radar module includes a planar antenna, a multilayer circuit board having a circuit for the transmission and reception of microwaves, and a housing made of metal. The planar antenna has a planar dipole whose radiating edges are shorter than their spacing from one another, and a substrate whose thickness is greater than 3 mm. This combination of the antenna and the multilayer circuit board on which the antenna is fastened, makes possible the small construction size with simultaneous excellent functional characteristics, such as high sensitivity with low transmission power and low emission of harmonics.

13 Claims, 5 Drawing Sheets

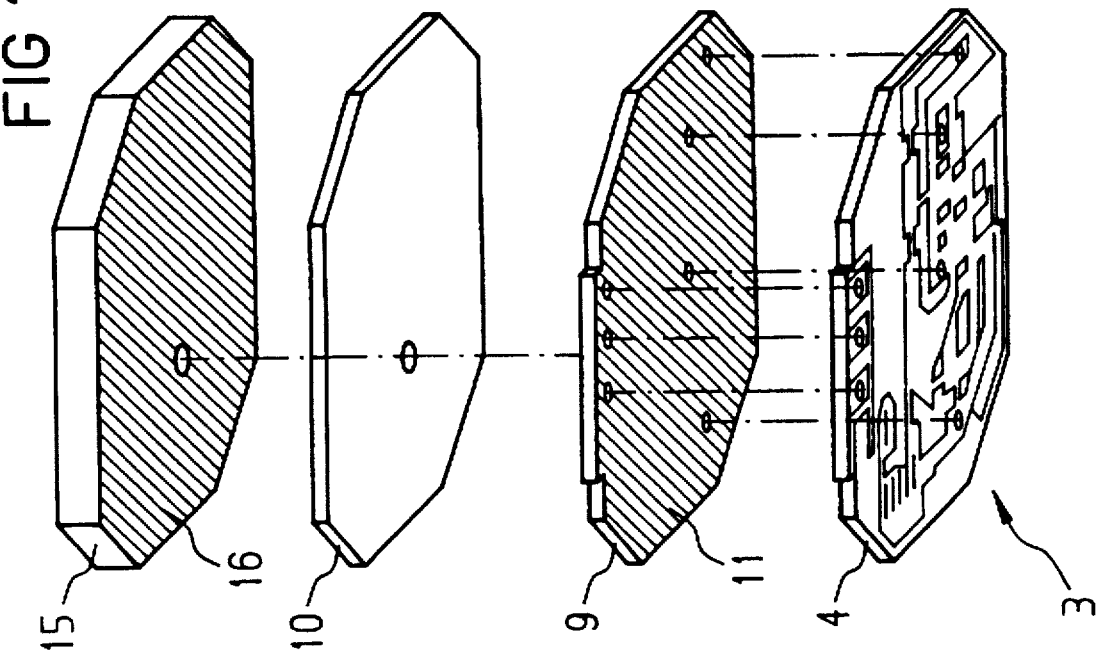
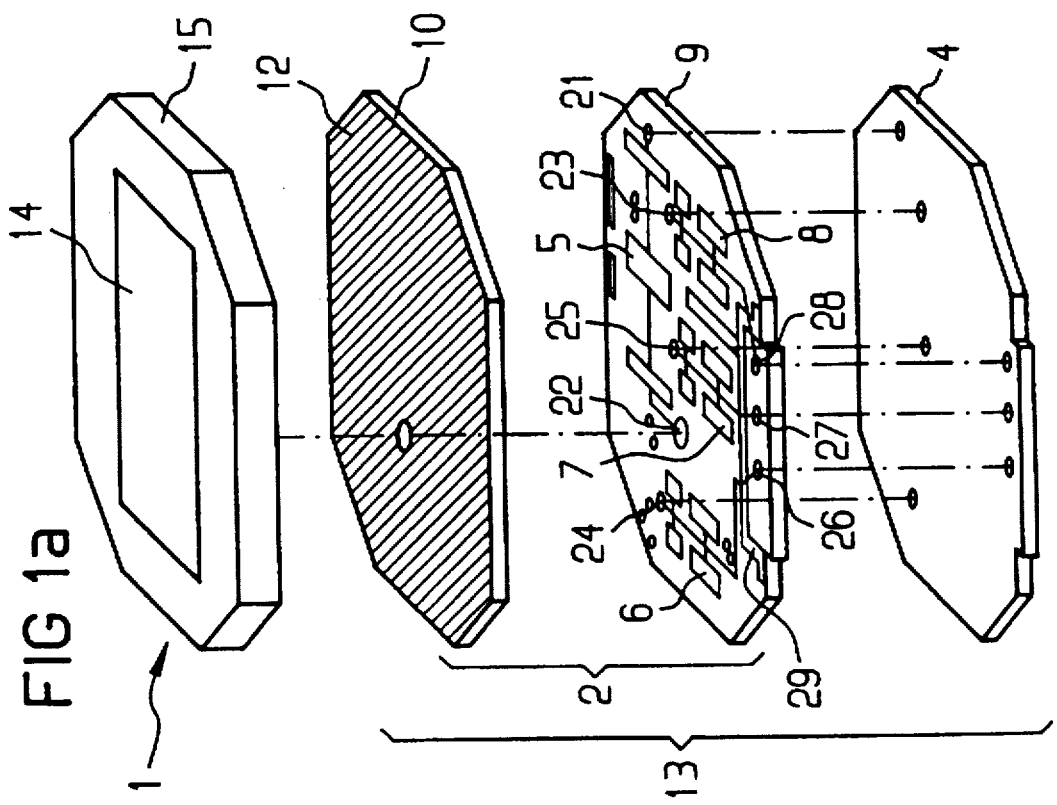

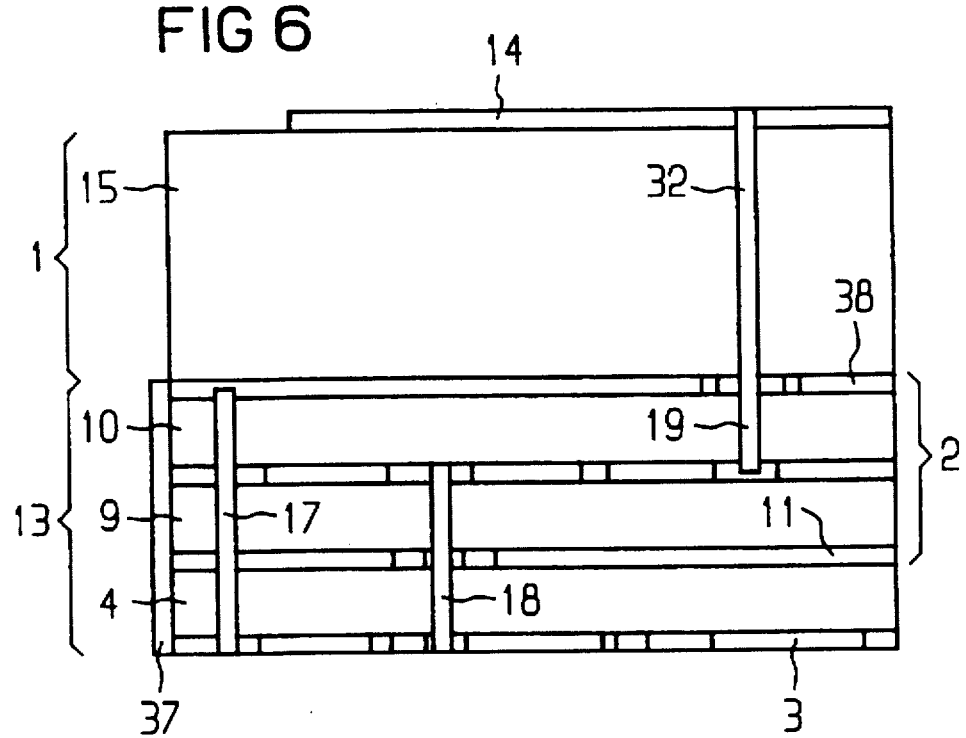

DOPPLER RADAR MODULE

BACKGROUND OF THE INVENTION

1. Field of the Invention

The present invention is directed to a Doppler radar module constructed in microstrip line technology and having an antenna, a circuit for transmission and reception of microwaves and a housing made of an electrically conductive material.

2. Description of the Prior Art

A Doppler radar module of the above general type is known for example from European Application 638 818 corresponding to U.S. Pat. No. 5,497,163. In this known Doppler radar module, a circuit for transmission and reception of microwaves is deposited in microstrip line technology on both sides of a multilayer circuit board fastened in a housing made of an electrically conductive material. A planar (patch) antenna and an LF (low frequency) board with a voltage regulator and Doppler signal amplifier are fastened to the outer surface of the housing. This particularly small Doppler radar module, of very simple construction, is designed for operation at about 10 GHz. At this frequency, it exhibits a low emission of harmonics and high sensitivity with low transmission power.

The above-described Doppler radar module according to the prior art, however, is not suited for operation at the telecommunication operating frequency permitted worldwide of about 2.45 GHz, since at this frequency it has an impermissibly high emission of harmonics, too low sensitivity and too large dimensions.

SUMMARY OF THE INVENTION

An object of the present invention is to provide a Doppler radar module that has a low emission of harmonics and high sensitivity in the lower GHz range, in particular at 2.45 GHz. At the same time, this Doppler radar module should be as small as possible and as simple to manufacture as possible.

This object is inventively solved in a Doppler radar module having a circuit for transmission and reception of microwaves which is deposited at least partially on a first electrically insulating substrate, and having a harmonic filter arrangement constructed as a tri-plate structure in which a plurality of filter structures is arranged at least partially on a second electrically insulating substrate. The inventive Doppler radar module further has an antenna in the form of a planar (patch) antenna in which a planar dipole is deposited on a fourth electrically insulating substrate. The first electrically insulating substrate is integrated with the circuit for transmission and reception of microwaves and the second electrically insulating substrate is integrated with the harmonic filter arrangement, so as to form a multilayer circuit board, and the antenna is fastened on the multilayer circuit board. The transmission/reception circuit, the harmonic filter arrangement and the planar dipole are connected with one another by electrically conductive substrate feedthroughs, corresponding to a predetermined circuit plan.

In an embodiment of the inventive Doppler radar module the circuit for transmission and reception of microwaves is deposited on a first electrically insulating substrate, and the harmonic filter arrangement is constructed as a tri-plate structure, in which a plurality of filter structures is arranged between second and third electrically insulating substrates, which respectively have first and second ground metallizations on sides respectively lying opposite the plurality of filter structures. The first electrically insulating substrate with the circuit for the transmission and reception of microwaves and the harmonic filter arrangement are integrated to form a multilayer circuit board, such that the first ground metallization lies on the side of the first electrically insulating substrate that lies opposite the circuit for the transmission and reception of microwaves. The antenna is a planar antenna in which a planar dipole is deposited on a fourth electrically insulating substrate, and the antenna is fastened on the multilayer circuit board such that the side of the fourth electrically insulating substrate lies opposite the second ground metallization. The transmission/reception circuit, the harmonic filter arrangement, the planar dipole and the first and the second ground metallization are connected with one another by electrically conductive substrate feedthroughs, corresponding to a predetermined circuit plan.

DESCRIPTION OF THE DRAWINGS

FIGS. 1a and 1b are exploded, perspective views of a multilayer circuit board divided into individual substrate levels, with an antenna according to the first exemplary embodiment of the invention, respectively seen from above and below.

FIG. 3b is a sectional view through the planar antenna along line A—A in FIG. 3a.

FIG. 5b is a schematic representation of a section through the Doppler radar module, along line B—B drawn in FIG. 5a.

FIG. 6 is a schematic representation of a section through a portion of the multilayer circuit board with the antenna, according to a second exemplary embodiment of the inventive module.

DESCRIPTION OF THE PREFERRED EMBODIMENTS

Figure 2:
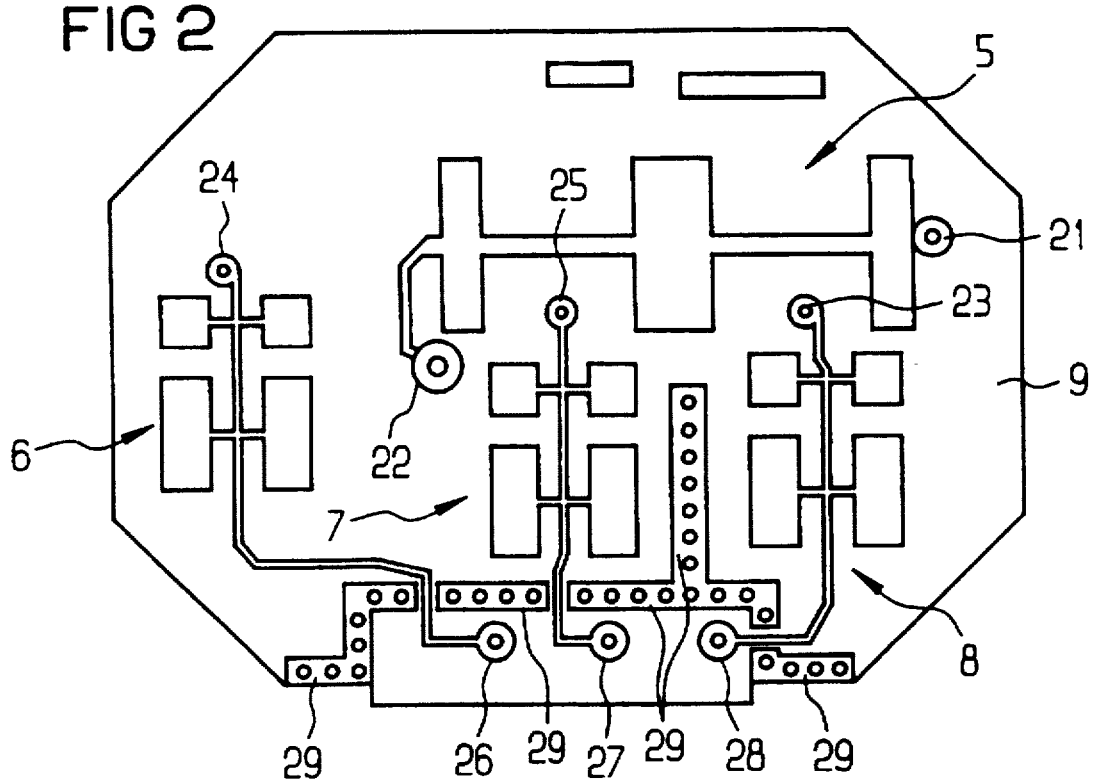
FIG. 2 is a top view of the substrate with the filter structures of the harmonic filter arrangement of the inventive module.

The multilayer circuit board 13 shown in FIGS. 1a and 1b is divided into individual substrate levels, such as three, e.g., octagonal electrically insulating substrates 4, 9, and 10 arranged in registry with one another. The substrates 4, 9 and 10 are made, e.g., of epoxy resin, Teflon® material, or $Al_2O_3$, and have, e.g., a thickness of about 0.5 mm. A circuit for the transmission and reception of microwaves (transmission/reception circuit) is deposited on the underside of the substrate 4. The substrate 9, arranged between the substrate 4 and the substrate 10, has a ground metallization 11 on its underside. On its upper side, there is deposited: an RF filter structure 5 with an RF coupling point 21 and an antenna terminal point 22; three AF filter structures 6, 7 and 8, which are respectively connected to DC coupling points 26, 27 and 28, and to circuit terminal points 23, 24 and 25, as well as to grounding segments 29. The upper side of the substrate 10 is provided with a ground metallization 12.

The RF and LF filter structures 5–8 on the upper side of the substrate form, together with the two ground metallizations 11 and 12, a harmonic filter arrangement 2 in a tri-plate structure. The RF filter structure 5 has a low throughput attenuation for the fundamental wave and a high attenuation for the first and second harmonics of the RF emission produced by the circuit 3. It is constructed, for example, as a fifth-order LC lowpass filter in microstrip line technology. The LF filter structures 6, 7 and 8 likewise suppress the harmonics. These structures 6, 7 and 8 likewise have a lowpass characteristic and may each be two stage LC blocking filters in microstrip line technology.

An antenna 1 is arranged over the substrate 10. This antenna 1 is formed by a further octagonal electrically insulating substrate 15, having an upper side with a planar dipole 14 deposited thereon and a lower side with a ground metallization 16 deposited thereon. The substrate 15 is made, e.g., of epoxy resin, Teflon® material, or $Al_2O_3$.

All the structures on the upper side of the substrate 9 and on the underside of the substrate 4, the ground metallizations 11, 12 and 16 and the planar dipole 14 are made, e.g., of a layer of Cu about 35 μm thick, or a layer of another electrically conductive material.

The assembly design employing the octagonal geometry of the multilayer circuit board 13 and the antenna I yields very small housing dimensions. Other geometries, such as, e.g., rectangular or oval, are also possible without a detrimental effect on functionality.

The schematic top view of the substrate 9 in FIG. 2 shows a preferred embodiment of the RF filter structure 5 with the RF coupling point 21 and antenna terminal point 22, the LF filter structures 6, 7 and 8 with circuit terminal points 23, 24 and 25, the DC coupling points 26, 27 and 28, and the grounding segments 29. The DC coupling points 26, 27 and 28 are arranged in a row at the edge of the substrate 9. The grounding segments 29 run essentially between the DC coupling points 26, 27 and 28 and the LF filter structures 6, 7 and 8. In addition, a grounding segment 29 is likewise deposited on the substrate 9, between the LF filter structures 7 and 8. The grounding segments 29 serve to reduce RF propagation in the substrate and to reduce lateral RF emission. A reduction of the lateral RF emission can also be achieved by means of an additional metallization of the side surfaces, known as an edge metallization of the substrates 9 and 10. The edge metallization may be, for example, a Cu layer about 35 μm thick.

Figure 3A:
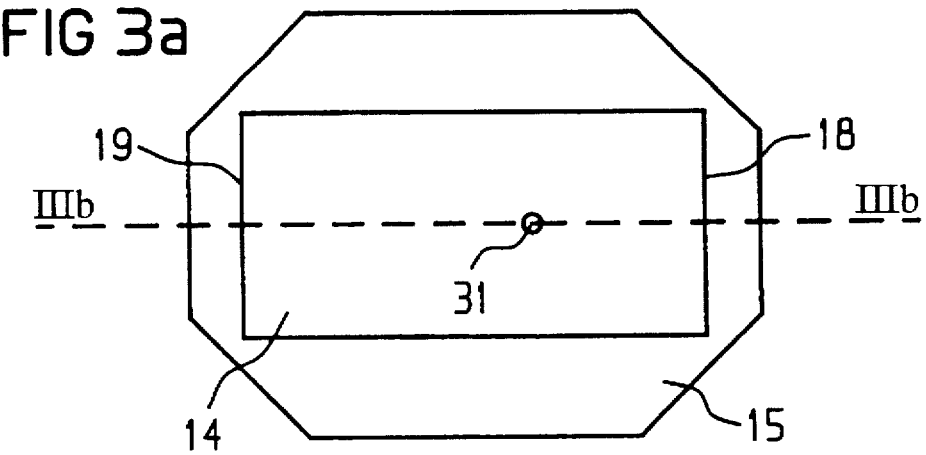
FIG. 3a is a top view of the planar antenna of the inventive module.

In the top view of the antenna 1 of the exemplary embodiment, shown in FIG. 3a, the octagonal substrate 15 is made of epoxy resin and the planar dipole 14 is made of a Cu layer having an RF feed point 31. The RF feed point 31 is connected with the multilayer circuit board 13 by an electrically conductive substrate feedthrough 32 (FIG. 3b), fed in an insulated manner through the ground metallization 16. The length of the radiating edges 18 and 19 of the planar dipole 14 is smaller than their spacing from one another, and the difference between the length of the substrate 15 and the spacing between the two radiating edges 18 and 19 is larger than 2 mm. The thickness of the substrate 15 is larger than 3 mm. By varying the spacing between the feed point 31 and the nearest-lying radiating edge 18, the impedance of the antenna 1 can be adjusted.

A particularly preferred embodiment of the antenna 1 for the operating frequency of about 2.45 GHZ has the following dimensions:

Length of the radiating edges 18, 19: 14 mm,

Spacing of the radiating edges 18, 19 from one another: 29.4 mm,

Width of the substrate 15: 26 mm,

Length of the substrate: 36 mm,

Thickness of the substrate: 3.3 mm, Spacing between the feed point 31 and the nearest-lying radiating edge 18: 11 mm.

Figure 3B:
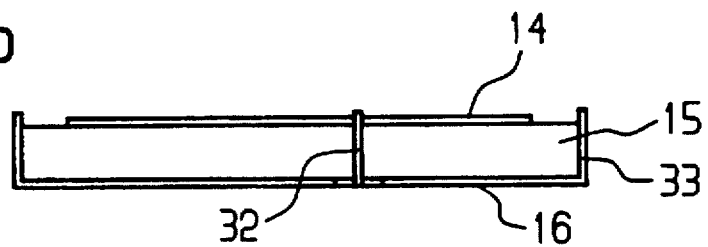

In a preferred embodiment of the antenna 1, the substrate 15 has (as shown in FIG. 3b) an edge metallization 33 that again, may be, for example a Cu layer that is 35 μm thick. This edge metallization 33 of the substrate 15 reduces the lateral propagation of the RF radiation, and the radiation characteristic of the antenna 1 is improved.

Figure 4A:
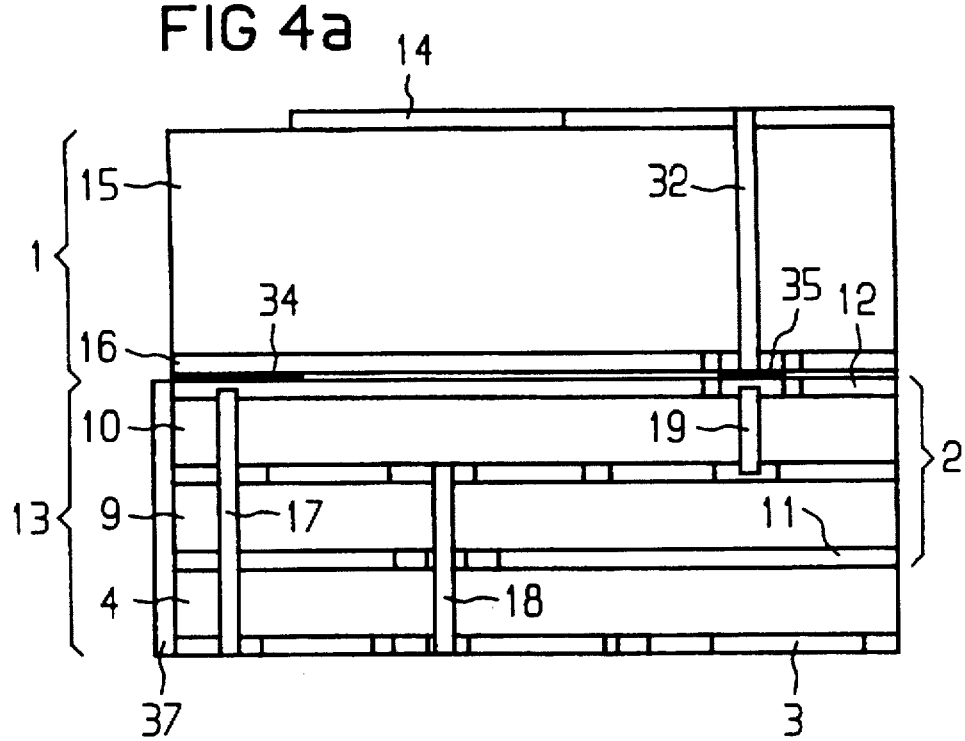
FIGS. 4a and 4b respectively show vertical sections through a portion of the multilayer circuit board with the antenna, according to the first exemplary embodiment.
Figure 4B:
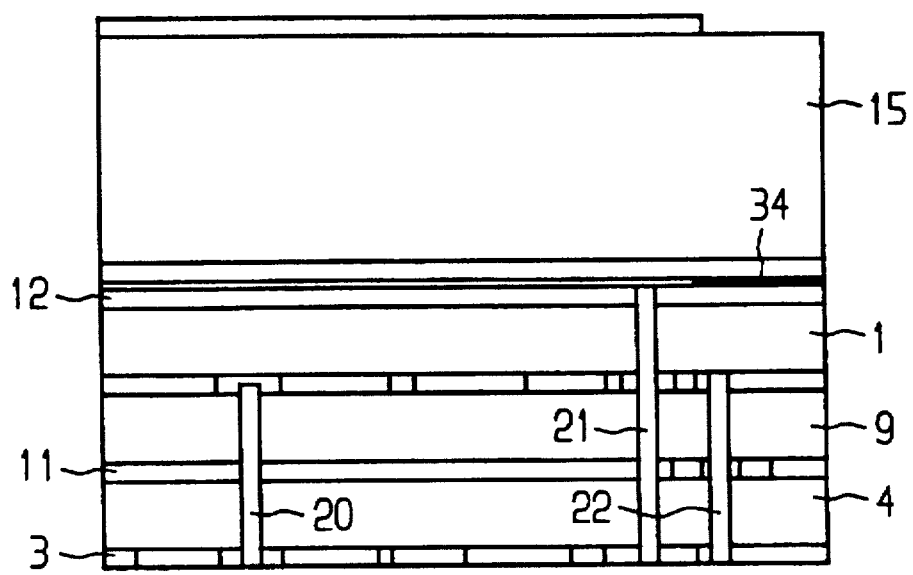

The schematic representation in FIGS. 4a and 4b of sections through the multilayer circuit board 13 with the antenna 1 illustrates the connection technique between the individual components of the Doppler radar module. This connection of the components among one another ensues by electrically conductive substrate feedthroughs 17,18, 19,20, 21 and 22. The ground metallizations 11 and 12 and the ground segments 29 are connected with one another by means of the substrate feedthroughs 17 and 21, called ground feedthroughs. Electrically conductive connection elements 34 and 35, made of metallic solder or electrically conductive adhesive, respectively connect the ground metallization 16 with the multilayer circuit board 13, and the substrate feedthrough 32 coming from the plane dipole 14 with the substrate feedthrough 19 of the multilayer circuit board 13.

In a preferred embodiment of the multilayer circuit board 13, an edge metallization 37 is provided on the side surfaces of the substrates 4, 9 and 10. This preferred multilayer circuit board 13 has no edge metallization absent only in the area of the outer terminal surfaces.

Figure 5A:
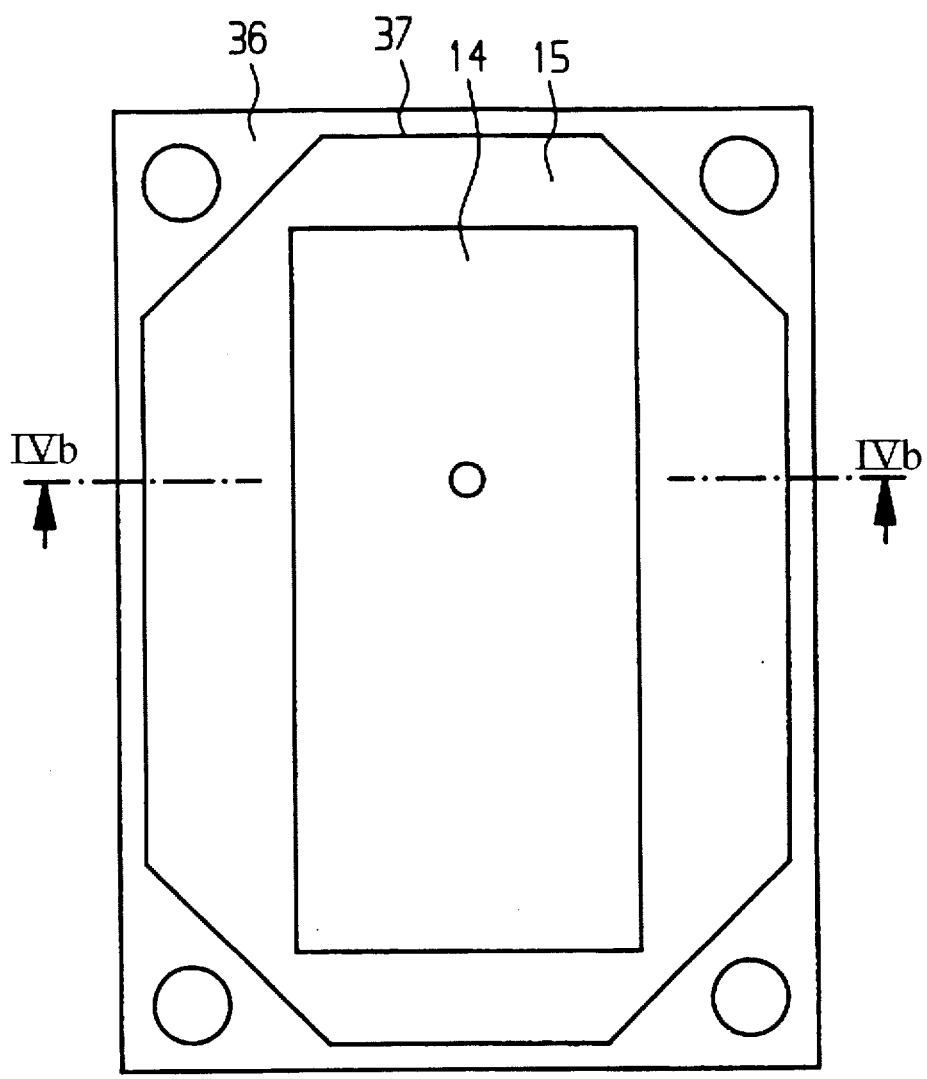
FIG. 5a is a top view of a Doppler radar module housing according to either of the two exemplary embodiments.
Figure 5B:
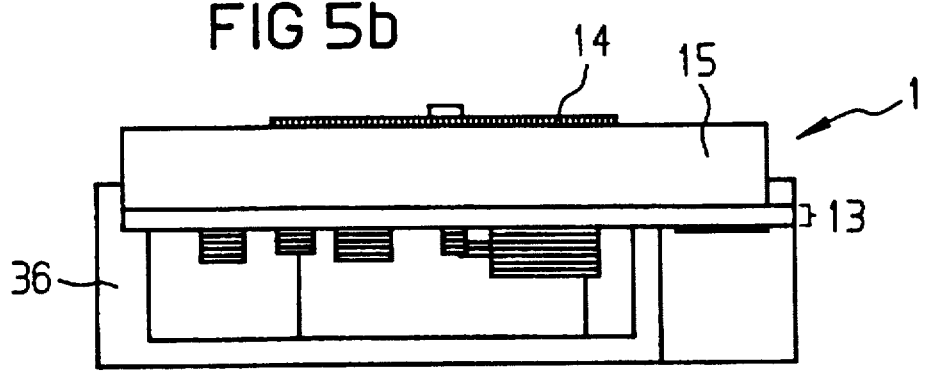

The housing 36 (FIGS. 5a and 5b) of the Doppler radar module according to the exemplary embodiment is made of an electrically conductive material and has, on its upper side, an octagonal opening 37, in which the multilayer circuit board 13 with the antenna 1 is fastened. The housing 36 is formed such that the DC supply and the Doppler signal decoupling can ensue via the harmonic filter arrangement 2.

The second exemplary embodiment of the inventive Doppler radar module differs from the first exemplary embodiment only, as shown in FIG. 6, in replacing the second 12 and third 16 ground metallization by a single ground metallization 38, optionally deposited on the substrate 10 or on the substrate 15. According to the second embodiment, the substrate 10 or the substrate 15 is then fastened to the ground metallization 38, e.g. by means of solder or an adhesive.

Although modifications and changes may be suggested by those skilled in the art, it is the intention of the inventor to embody within the patent warranted hereon all changes and modifications as reasonably and properly come within the scope of his contribution to the art.

We claim as our invention:

1. In a Doppler radar module constructed in microstrip line technology and having an antenna a transmission/reception circuit for transmitting and receiving microwaves, and a housing of an electrically conductive material, the improvement comprising:

the transmission/reception circuit being deposited at least partially on a first electrically insulating substrate;

a harmonic filter arrangement constructed as a tri-plate structure and having a plurality of filter structures arranged at least partially on a second electrically insulating substrate;

the antenna comprising a planar antenna formed by a planar dipole deposited on a further electrically insulating substrate;

the first electrically insulating substrate and the second electrically insulating substrate being integrated in a multilayer circuit board and the antenna being fastened on the multilayer circuit board; and electrically conductive substrate feedthroughs connecting the transmission/reception circuit, the harmonic filter arrangement and the planar dipole with one another corresponding to a predetermined circuit plan.

2. The improvement of claim 1 wherein said further substrate constitutes a fourth substrate and said improvement further comprising:

a plurality of filter structures arranged between said second substrate and a third electrically insulating substrate, said second and third substrates respectively having first and second ground metallizations on respective sides thereof lying opposite the plurality of filter structures, the first and second electrically insulating substrates being integrated in said multilayer circuit board with the first ground metallization on a side of the first electrically insulating substrate lying opposite the transmission/reception circuit;

the antenna being fastened on the multilayer circuit board with a side of the fourth electrically insulating substrate lying opposite the planar dipole also lying opposite the second ground metallization; and wherein the transmission/reception circuit, the harmonic filter arrangement, the planar dipole and the first and second ground metallizations are connected with one another by said electrically conductive substrate feedthroughs corresponding to said predetermined circuit plan.

3. The improvement of claim 2 further comprising a third ground metallization electrically connected with the second ground metallization disposed on the fourth electrically insulating substrate on the side thereof lying opposite the plane dipole.

4. The improvement of claim 2 further comprising a plurality of DC coupling points disposed at an edge of said second substrate on the side thereof on which the filter structures are deposited.

5. The improvement of claim 2 comprising edge metallizations respectively disposed on the second substrate and on the third substrate.

6. The improvement of claim 2 wherein said transmission/reception circuit is deposited completely on said first electrically insulating substrate.

7. The improvement of claim 1 wherein said transmission/reception circuit, said harmonic filter arrangement and said planar dipole comprise means for operating at a frequency in a frequency range of 1 to 5 GHz.

8. The improvement of claim 1 wherein said planar dipole has radiating edges spaced from each other and each having a length smaller than a spacing between said radiating edges, a difference between a length of the fourth substrate and the spacing between the radiating edges larger than 2 mm, and fourth substrate having a thickness larger than 3 mm.

9. The improvement of claim 1 further comprising an edge metallization on said further electrically insulating substrate.

10. The improvement of claim 1 wherein the harmonic filter arrangement comprises:

an RF tri-plate filter connected between the transmission/reception circuit and the antenna; and three LF tri-plate filters respectively connected to DC coupling points and to said transmission/reception circuit.

11. The improvement of claim 10 further comprising a plurality of grounding segments preventing lateral emission of the microwave radiation disposed on said second substrate on the side thereof on which the filter structures are deposited between the LF filter structures and the DC couplings.

12. The improvement of claim 1 further comprising an edge metallization on said multilayer circuit board.

13. The improvement of claim 1 further comprising at least one ground segment that prevents a lateral emission of the microwave radiation disposed on the first substrate on the side thereof on which the transmission/reception circuit is deposited.

* * * * *